G. P. HERNDON.
Churn.

No. 161,230. Patented March 23, 1875.

WITNESSES
Henry N. Miller
C. L. Ewerth

INVENTOR
George P. Herndon.
per
Alexander A. Mason
ATTORNEYS

UNITED STATES PATENT OFFICE.

GEORGE P. HERNDON, OF TUPELO, MISSISSIPPI.

IMPROVEMENT IN CHURNS.

Specification forming part of Letters Patent No. 161,230, dated March 23, 1875; application filed January 19, 1875.

*To all whom it may concern:*

Be it known that I, GEORGE P. HERNDON, of Tupelo, in the county of Lee and in the State of Mississippi, have invented certain new and useful Improvements in Churns; and do hereby declare that the following is a full, clear, and exact description thereof, reference being had to the accompanying drawings, and to the letters of reference marked thereon, making a part of this specification.

The nature of my invention consists in the construction and arrangement of a churn, as will be hereinafter more fully set forth.

Figure 1:
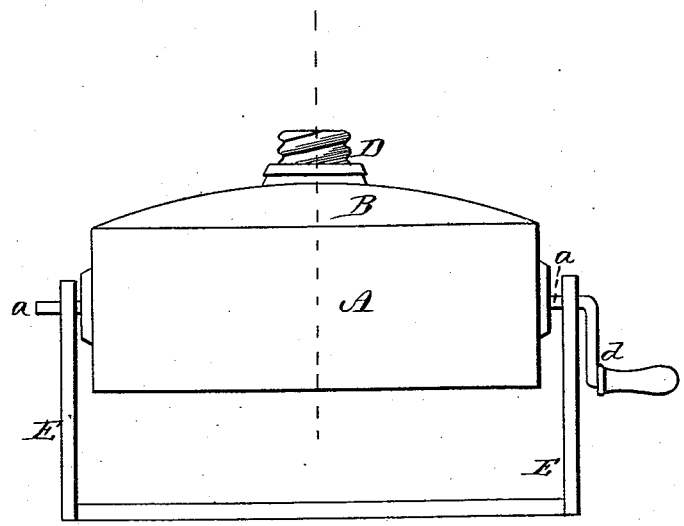
Figure 2:
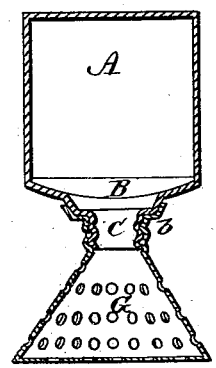

In the annexed drawing, Figure 1 is a side elevation of my churn; and Fig. 2 is an inverted transverse section of the same, with butter-collector attached thereto.

A represents my churn, made in the shape of a rectangular box of any suitable dimensions, having an oval top, B, in the center of which is a short inlet-pipe, C, closed by a screw-cap, D. The ends of the box A are provided with projecting journals $a$ $a$, which have their bearings in a stand, E, and one of which is provided with a crank, $d$, for revolving the churn. It will be seen that the churn is entirely devoid of all dashers, breakers, or other interior devices, which simply make the churn more expensive without in the least adding to its butter-producing qualities. By practice I have found that by simply revolving this churn upon its journals butter will be produced in about fifteen minutes, the right angles of the churn breaking the globules thoroughly, so that very little, if any, butter will remain in the buttermilk. G represents a conical cup of any suitable dimensions, having its sides perforated with a number of holes, as shown in Fig. 2, and the apex of the cone formed with a screw-collar, $b$. As soon as the churning process is completed the screw-cap D is removed, and the conical cup or vessel G is screwed on the pipe C. The churn is then reversed, and the concave top B—now underneath—will conduct the entire contents of the churn into the cup G, the milk passing through the perforations in the same, and the butter remaining in the cup, to be afterward taken out and worked in the usual manner.

Having thus fully described my invention, what I claim as new, and desire to secure by Letters Patent, is—

The combination of the rectangular revolving box A, having screw inlet-pipe C, and the perforated conical screw-cup G, all constructed substantially as set forth.

In testimony that I claim the foregoing I have hereunto set my hand this 22d day of December, 1874.

GEO. P. HERNDON.

Witnesses:
S. W. HAWKINS,
NORBIN JONES.